United States Patent Office 2,893,963
Patented July 7, 1959

2,893,963

PROCESS FOR THE PRODUCTION OF PARTICULATE FOAMABLE STYRENE POLYMERS

William James Cleland, Robert George Thomas, and Ernest Seijo, Manchester, England, assignors to Styrene Products Limited, London, England, a British company No Drawing. Application November 23, 1956
Serial No. 623,771

Claims priority, application Great Britain
December 2, 1955

5 Claims. (Cl. 260—2.5)

This invention is concerned with a process for the production of thermoplastic products, hereinafter referred to as "expandable" thermoplastic products, which can be expanded to form materials having a cellular structure. The invention is also concerned with the production of expanded thermoplastic materials i.e. materials having a cellular structure.

A process for the manufacture of expanded thermoplastic, synthetic resinous materials has been heretofore proposed, which comprises immersing the thermoplastic material in the form of discrete particles in a volatile non-solvent organic liquid, which may contain a minor proportion of volatile solvent, removing excess liquid from the particles, shaping the wetted particles in a mould and subjecting them in the mould to a heat treatment sufficient only to effect a sintering of the particles, cooling the blank thus formed and thereafter removing it from the mould and subjecting it to a heat treatment at a temperature at which the material is plastic and the volatile liquid is vaporized. By this process an expanded blank is obtained.

It has also been proposed to produce expanded thermoplastic materials by introducing a gas into the heat-softened material under high pressure and then releasing the pressure, for example, by extrusion.

It has now been found that an expandable thermoplastic product in the form of discrete particles may advantageously be produced by the incorporation therein of a hydrocarbon or a mixture of hydrocarbons which is gaseous at atmospheric temperature and pressure (about 25° C. and 1 atmosphere pressure), with the aid of a liquid swelling agent for the thermoplastic material.

It has further been found that expandable materials produced in this manner can be moulded and expanded simultaneously simply by the application of heat thereto in a mould.

The invention is a process for the production of expandable, thermoplastic products which comprises wetting the thermoplastic material in the form of discrete particles with a quantity of liquid solvent or swelling agent sufficient to cause swelling thereof while retaining their discrete form, and then introducing a hydrocarbon or a mixture of hydrocarbons which is gaseous at atmospheric temperature and pressure and is soluble in said solvent, into the swollen particles.

The invention also includes the production of expanded thermoplastic material by heating the expandable thermoplastic product, produced as set out in the preceding paragraph, in a mould at a temperature at which the product is plastic, and flows, and in the resulting expanded product.

The invention further includes an expandable thermoplastic material which retains its form at atmospheric temperature and pressure and comprises a thermoplastic material in the form of discrete particles having incorporated therein one or more hydrocarbons which are gaseous at atmospheric temperature and pressure.

The invention may be applied to synthetic thermoplastic polymers such as polystyrene, copolymers of styrene and other monovinylidene compounds such as polyalkyl acrylates such as polymethyl methacrylate, polyethyl acrylate and the like. In the process for the production of expandable materials, the thermoplastic material may be added in the form of a moulding powder or of beads or pearls such as are produced by a suspension polymerization process. Pearl polymers having discrete particles in the range of about 0.05 to 3 mm. are very suitable.

The hydrocarbon non-solvents which are incorporated in the thermoplastic materials in accordance with the invention to serve as expanding or foaming agent are those which are normally regarded as gases, i.e. they are gases at about 15° C. and 760 mms. pressure, and are hydrocarbons or mixtures thereof which can be liquefied under moderate pressure, i.e. under pressures of about 40 lbs./sq. in. or less. Suitable hydrocarbons are thus the $C_4$ hydrocarbons or mixtures consisting preponderantly of such hydrocarbons. 2,2-dimethyl propane or mixtures containing this compound may also be used. Preferably butane or mixtures containing 80% or more of butane are used. Thus commercially available liquefied petroleum gases such as Shellane or Flamo which are largely butane, but contain some propane may advantageously be used and may be introduced into a reactor containing the swollen, discrete particles of thermoplastic material in liquefied form.

The solvent liquids used as swelling agents in the process of the invention do not act as expanding agents but serve to facilitate the penetration of the thermoplastic material by the gaseous expanding agent and consequently the choice of solvent is not limited by considerations of volatility. Thus, in addition to volatile solvents, high boiling solvents having boiling points above 300° C. may be used. For polystyrene, for example, solvents such as methylene chloride, ethyl acetate, amyl acetate, carbon tetrachloride, benzene, dioxane and tritolyl phosphate may be used. The solvent used should also be a solvent for the gaseous expanding agent.

When the invention is applied to thermoplastic polymers produced by a polymerization process the solvent may be added prior to or after polymerization. When the solvent is added direct to the thermoplastic polymer, its molecular size should be sufficiently small to allow easy penetration of the polymer. When added to a monomer prior to polymerization it should be such as not to interfere with the polymerization process and should be stable under the conditions of polymerization.

Generally speaking, the amount of solvent used should be between 1 and 5% calculated on the weight of the thermoplastic starting material and the amount of expanding agent used should be between 5 and 12%, calculated on the same basis.

In a preferred method of carrying out the process of the invention for the production of expandable, thermoplastic materials, the thermoplastic material is maintained dispersed in the form of discrete particles in an inert liquid, preferably water, and the solvent, if not already present, and expanding agent are added to the suspension. In such cases, when using water and a solvent, e.g. dioxane, which is soluble in water, the solubility in water is minimized by the addition of soluble salts such as sodium chloride. The expanding agent is preferably added in liquid form as this reduces the time taken for absorption of the required amount of expanding agent.

The following general procedure for the production of expandable polystyrene is illustrative of this preferred method.

The polystyrene in the form of a moulding powder or beads is charged into a reactor equipped with an efficient stirrer and capable of withstanding a pressure of 4 lbs.

per sq. inch, together with a least an equal weight of water. The solvent liquid is added with vigorous agitation, which should be maintained through the process. A quantity of a suspension stabilizer or anti-coalescing agent, e.g. a finely-divided calcium phosphate, an alkali metal salt of an organic sulfuric or sulfonic acid, a polyethylene glycol ester or ether of a polyvinyl alcohol, may be added either at the beginning of the process or just prior to charging with the expanding agent. The purpose of the stabilizing agent is to minimize the tendency of the particles to coalesce during the addition of the expanding agent, but is usually not necessary when a high water to polymer ratio is used, such as a weight ratio of about 1.5:1 to 4:1 or higher.

The reaction vessel is now closed and the introduction of the gaseous expanding agent under pressure, preferably in liquefied form, is commenced. The addition is effected in small portions at intervals or continuously; in either case it should take between 2 and 8 hours when the expanding agent is added as a liquid. When the addition is completed, stirring is continued for a further 2 to 4 hours. The excess pressure is then released, allowing unabsorbed gas to escape. The polystyrene is then freed from the stabilizer by suitable washing, centrifuged and placed in airtight containers without drying. The polystyrene may be stored in this manner for long periods prior to expanding and moulding.

Liquefied gas may be introduced into a sealed reactor under its own pressure when the temperature conditions are suitable, i.e. when the temperature of the liquid gas is about 5° C. higher than the temperature within the reactor. Such conditions may be obtained in practice, but, if not, the reactor may be cooled by circulating cooling water around it or the pressure of the liquid gas may be boosted, for example, by using a pump.

The invention has the advantages that it provides a process for the production of expandable materials:

(1) Which can be carried out at relatively low pressures and at atmospheric temperature, (2) Which avoids the need for immersing the thermoplastic material in relatively large quantities of liquid expanding agent with its consequent losses of valuable material, (3) Which yields an expandable material in the form of discrete particles for long periods, (4) Which yields an expandable material which can be simultaneously expanded and molded simply by the application of heat thereto in a mould, (5) Which yields an expandable material which gives expanded mouldings in which the tendency to shrink on cooling is minimized.

The invention is illustrated by the following examples.

*Example 1*

A mixing vessel of 21 gallons capacity, equipped with stirrer and baffle and adapted to be sealed off to resist an internal pressure of 40 lbs. per sq. inch was used.

70 pounds of polystyrene beads, which had been prepared by a suspension polymerization process, and 12 gallons of water were introduced into the mixing vessel and agitation was commenced. 120 grams of a finely divided calcium phosphate suspension stabilizer were then added and this was followed by the addition of 2.44 lbs. of methylene chloride dropwise over a period of one hour. 90 minutes after the addition of the methylene chloride was completed, the vessel was sealed off except for an inlet for introducing the expanding agent. Through this inlet there was introduced in portions of a quarter of a a pound at intervals a liquefied $C_4$ hydrocarbon gas mixture consisting preponderantly of butane. This hydrocarbon mixture was under a pressure of about 35 lbs. per sq. inch and was allowed to flow into the mixing vessel under its own pressure, the temperature of the hydrocarbon mixture being about 5° C. higher than that in the reactor. The hydrocarbon additions were continued over a period of 5 hours until a total of 7 lbs. had been added. During the additions the pressure in the vessel rose to a maximum of 30 lbs. per sq. inch and dropped slightly between each addition as the hydrocarbons were absorbed by the polystyrene.

Agitation, which had been maintained throughout the above operations, was continued for a further three hours after the last of the hydrocarbon mixture had been added. The beads were then treated with dilute hydrochloric acid (for removal of the calcium phosphate), washed and centrifuged. There was obtained in this manner an expandable polystyrene which could be stored, before expansion, for long periods in airtight containers.

The expandable polystyrene was converted into blocks of expanded polystyrene of attractive appearance by heating in moulds in boiling water. The expanded material weighed about 2.5 lbs. per cubic foot which is equivalent to an expansion of approximately 25 times.

*Example 2*

73 pounds of polystyrene beads and 12 gallons of water were introduced into the mixing vessel referred to in Example 1 and agitation was commenced. 3.85 pounds of ethyl acetate were then added dropwise over a period of 45 minutes. 70 minutes after completion of the addition of ethyl acetate, 60 gms. of a finely divided calcium phosphate stabilizer were added. The vessel was then sealed off and the introduction of a liquefied $C_4$ hydrocarbon gas mixture as in Example 1 was commenced. 6½ pounds in total of hydrocarbon mixture was added over a period of 6 hours in portions of ¼ lb. at a time. The pressure rose to a maximum of 30 lbs. per sq. inch and followed the course outlined in Example 1. Agitation was continued for a further two hours, the pressure released and the beads treated as described in Example 1.

The expandable polystyrene obtained in this manner yielded blocks of expanded polystyrene weighing about 2 lbs. per cubic foot (about 30 times expansion) when heated in moulds in boiling water.

The heat-expandable plastic products are valuable materials for a variety of uses. They are useful in manufacture of many articles of commerce wherein both strength and light weight are needed such as balls, fish-net floats, packing discs, toys, etc. Moreover, the porous foamed products are excellent as heat insulating material for filling wall and door voids of refrigerators, and for giving strength to void space in aircraft wings, boat hulls and the like.

We claim as our invention:

1. A process for the production of a thermoplastic product capable of being expanded to a porous foam upon application of heat which comprises wetting a thermoplastic polymeric solid material selected from the group consisting of polystyrene and copolymers of styrene with another mono-vinylidene compound in the form of minute discrete particles with from about 1% to 5% by weight of the thermoplastic material of a non-reactive liquid selected from the group consisting of non-reactive liquid solvent and non-reactive liquid swelling agents for said thermoplastic polymeric material, which is sufficient to cause swelling thereof while retaining their discrete form, and then introducing a paraffinic hydrocarbon non-solvent for the material, which non-solvent is gaseous at 15° C. and 760 mm. Hg pressure, can be liquefied under pressures no greater than 40 lbs./sq. in., and is soluble in said non-reactive liquid solvent, into the swollen particles at superatmospheric pressure.

2. A process according to claim 1 wherein the polymeric material is polystyrene and the non-solvent is butane.

3. A process for the production of a heat-expandable polystyrene product capable of being expanded to a porous foam up application of heat which comprises wetting minute discrete particles of polystyrene agitated with at least an equal weight of water containing an anti-coalescing agent with from about 1% to 5% by weight of the polystyrene of non-reactive liquid solvent for said polystyrene which is sufficient to cause swelling thereof while retaining their discrete form, and then introducing a paraffinic hydrocarbon non-solvent for the polystyrene, which non-solvent is gaseous at 15° C. and 760 mm. Hg pressure, can be liquefied under pressure no greater than 40 lbs./sq. in., and is soluble in the liquid solvent, into the swollen particles at superatmospheric pressure.

4. A process according to claim 3 wherein the non-solvent is butane and the amount is about 5 to 12% of the polystyrene.

5. A process for the production of an expanded porous foam which comprises heating at about 100° C. at 760 mm. Hg pressure the product obtained according to claim 1 to form a porous foam, and then cooling the foam below its flow temperature.

References Cited in the file of this patent

UNITED STATES PATENTS 2,744,291   Stastny et al. _____ May 8, 1956